US012757070B2

(12) United States Patent
Deshpande et al.

(10) Patent No.: US 12,757,070 B2
(45) Date of Patent: Oct. 6, 2026

(54) SYSTEM AND METHOD FOR FRAGMENTED IPv4 HEADER COMPRESSION WITH ROBUST HEADER COMPRESSION IN A DATA COMMUNICATION NETWORK

(71) Applicant: Hughes Network Systems, LLC, Germantown, MD (US)

(72) Inventors: Avadhoot Vivek Deshpande, Gaithersburg, MD (US); Zili Qian, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 42 days.

(21) Appl. No.: 18/756,746

(22) Filed: Jun. 27, 2024

(65) Prior Publication Data

US 2026/0006492 A1 Jan. 1, 2026

(51) Int. Cl.

*H04L 69/22* (2022.01)
*H04L 12/66* (2006.01)
*H04L 69/04* (2022.01)
*H04W 28/06* (2009.01)

(52) U.S. Cl.

CPC ........... *H04W 28/065* (2013.01); *H04L 69/04* (2013.01)

(58) Field of Classification Search

CPC ......... H04L 69/22; H04L 69/04; H04L 69/16; H04L 69/161; H04L 69/166; H04L 2212/00; H04L 47/36

See application file for complete search history.

(56) References Cited

U.S. PATENT DOCUMENTS

| | | | | |
|---|---|---|---|---|
| 2004/0073711 A1* | 4/2004 | Pelletier | H04L 69/04 | 709/249 |
| 2010/0322151 A1* | 12/2010 | Racz | H04W 28/06 | 370/328 |
| 2013/0155918 A1* | 6/2013 | Singh | H04L 69/04 | 370/310 |
| 2018/0006749 A1* | 1/2018 | Oh | H04N 21/854 | |

OTHER PUBLICATIONS

Steven Iveson, IP Fragmentation in Detail, Packet Pushers, https://packetpushers.net/blog/ip-fragmentation-in-detail/ (Year: 2019).*

(Continued)

*Primary Examiner* — Nicholas R Taylor
*Assistant Examiner* — Ho T Shiu
(74) *Attorney, Agent, or Firm* — NovoTechIP International PLLC

(57) ABSTRACT

A communication system and method for receiving a datagram with an uncompressed IPv4 header at a ROHC compressor in the communication system and compressing the uncompressed IPv4 header using the ROHC compressor to form the datagram with the ROHC header. The compressing by the ROHC compressor includes setting a flag in a dynamic part of an initialization and refresh (IR) packet of the ROHC header indicating that a 'more fragment flag' (MF) bit and a non-zero 'fragment offset' field are present in the ROHC header, as well as appending the MF bit and the non-zero 'fragment offset' field at an end of the IR packet.

20 Claims, 9 Drawing Sheets

(56) References Cited

OTHER PUBLICATIONS

Borman et al., "RFC 3095: RObust Header Compression (ROHC): Framework and four profiles: RTP, UDP, ESP, and uncompressed," Standards Track, The Internet Society (Jul. 2001), pp. 1-168 (https://datatracker.ietf.org/doc/html/rfc3095).

Johnson et al., "RFC 3843: RObust Header Compression (ROHC): A Compression Profile for IP," Standards Track, The Internet Society (Jun. 2004), pp. 1-16 (https://www.rfc-editor.org/rfc/rfc3843.txt).

Information Sciences Institute, "RFC 791: Internet Protocol DARPA Internet Program Protocol Specification," Internet Protocol (Sep. 1981), pp. 1-45 (https://www.rfc-editor.org/rfc/rfc791).

Pelletier et al., "RFC 5225: RObust Header Compression Version 2 (ROHCv2): Profiles for RTP, UDP, IP, ESP and UDP-Lite," Standards Track (Apr. 2008), pp. 1-124 (https://datatracker.ietf.org/doc/html/rfc5225).

* cited by examiner

500

504 504'

| IPv4 IR Dynamic part before introducing 'more_frag_and_frag_offset_indicator' | Ipv4 IR Dynamic part after introducing 'more_frag_and_frag_offset_indicator' |
|---|---|
| COMPRESSED ipv4_endpoint_innermost_dynamic{<br>ENFORCE((is_innermost == 1) && (profile_value == PROFILE_IP_0104));<br>ENFORCE(ip_id_behavior_innermost.UVALUE == ip_id_behavior_value);<br>reserved =:= '000' [ 3];<br>reorder_ratio =:= irregular(2) [ 2];<br>df =:= irregular(1) [ 1];<br>ip_id_behavior_innermost =:= irregular(2) [ 2];<br>tos_tc =:= irregular(8) [ 8];<br>ttl_hopl =:= irregular(8) [ 8];<br>ip_id =:= ip_id_enc_dyn(ip_id_behavior_innermost.UVALUE) [0, 16 ];<br>msn =:= irregular(16) [16];<br>} | COMPRESSED ipv4_endpoint_innermost_dynamic{<br>ENFORCE((is_innermost == 1) && (profile_value == PROFILE_IP_0104));<br>ENFORCE(ip_id_behavior_innermost.UVALUE == ip_id_behavior_value);<br>reserved =:= '00' [ 2];<br>**more_frag_and_frag_offset_indicator =:= irregular(1) [ 1];** 502<br>reorder_ratio =:= irregular(2) [ 2];<br>df =:= irregular(1) [ 1];<br>ip_id_behavior_innermost =:= irregular(2) [ 2];<br>tos_tc =:= irregular(8) [ 8];<br>ttl_hopl =:= irregular(8) [ 8];<br>ip_id =:= ip_id_enc_dyn(ip_id_behavior_innermost.UVALUE) [0, 16 ];<br>msn =:= irregular(16) [16];<br>**more_frag_and_frag_offset =:= irregular(16) more fragment and frag offset fields innermost [ 16];**<br>} 510 |

512

FIG. 5A

520

Co_common header before introducing 'more_frag_and_frag_offset_indicator'

```
// Replacement for UOR-2-ext3
 COMPRESSED co_common{
  ENFORCE(outer_ip_flag==outer_ip_indicator.CVALUE);
  discriminator =:='11111010'                [8];
  ip_id_indicator =:= irregular(1)            [1];
  header_crc  =:= crc7(THIS.UVALUE, THIS.ULENGTH)   [7];
  flags_indicator =:= irregular(1)           [1];
  ttl_hopl_indicator =:= irregular(1)          [1];
  tos_tc_indicator  =:= irregular(1)          [1];
  reorder_ratio   =:= irregular(2)          [2];
  control_crc3   =:= control_crc3_encoding      [3];
  outer_ip_indicator : df : ip_id_behavior_innermost=:=
   profile_2_3_4_flags_enc(
   flags_indicator.CVALUE, ip_version.UVALUE)      [0,8];
  tos_tc =:= static_or_irreg(tos_tc_indicator.CVALUE,8) [0,8
];
  ttl_hopl =:= static_or_irreg(ttl_hopl_indicator.CVALUE,
   ttl_hopl.ULENGTH)                [0,8];
  msn       =:= msn_lsb(8)          [8];
  ip_id =:=
ip_id_sequential_variable(ip_id_behavior_innermost.UVAL
UE,
   ip_id_indicator.CVALUE)            [0,8,16];
}
```

520'

Co_common header after introducing 'more_frag_and_frag_offset_indicator'

```
// Replacement for UOR-2-ext3
COMPRESSED co_common {
 ENFORCE(outer_ip_flag == outer_ip_indicator.CVALUE);
 discriminator      =:= '11111010'    [8];
 ip_id_indicator     =:= irregular(1)   [1];
 header_crc =:= crc7(THIS.UVALUE, THIS.ULENGTH)   [7];
 flags_indicator     =:= irregular(1)     [1];
 ttl_hopl_indicator  =:= irregular(1)       [1];
 tos_tc_indicator    =:= irregular(1)      [1];
 reorder_ratio      =:= irregular(2)     [2];
 control_crc3       =:= control_crc3_encoding [3];
 outer_ip_indicator : df : ip_id_behavior_innermost
more_frag_and_frag_offset_indicator_innermost_ip=:=
 profile_2_3_4_flags_enc(
 flags_indicator.CVALUE, ip_version.UVALUE)      [0,8];
tos_tc =:= static_or_irreg(tos_tc_indicator.CVALUE,8) [0,8]
ttl_hopl =:= static_or_irreg(ttl_hopl_indicator.CVALUE,
ttl_hopl.ULENGTH)               [0,8];
msn        =:= msn_lsb(8)       [8];
ip_id =:=
ip_id_sequential_variable(ip_id_behavior_innermost.UVALUE,
 ip_id_indicator.CVALUE)        [0, 8, 16];
}
```

502'

```
Pseudo structure:
Irregular chain
 COMPRESSED more_frag_and_frag_offset {
  ENFORCE(is_innermost == 1);
  ENFORCE(more_frag_and_frag_offset_
  indicator_innermost_ip ==
1);
  more_frag_and_frag_offset =:= irregular(16)
[ 16 ];
 }
```

515

510'

FIG. 5B

| IPinIP ROHC Profile | User Data Traffic Type | IPinIP Header Bytes - Without ROHC Compression | IPinIP Header Bytes with Outer IP-Only Compression | Avg. Gain % with Outer IP-Only Compression | IPinIP Header Bytes with IPinIP Compression | Avg. Gain % with IPinIP Compression |
|---|---|---|---|---|---|---|
| IPv4 (innermost) in IPv4 (outermost) | Fragmented ICMP | 40 | 25 | 37.5 | 12 | 70 |
| IPv4 (innermost) in IPv4 (outermost) | Fragmented UDP | 40 | 26 | 35 | 12 | 70 |
| Ipv4 (innermost) in IPv6 (outermost) | Fragmented ICMP | 60 | 25 | 58.33333333 | 10 | 83.33333333 |
| IPv4 (innermost) in IPv6 (outermost) | Fragmented UDP | 60 | 25 | 58.33333333 | 10 | 83.33333333 |

FIG. 9A

| IP-Only ROHC Profile | User Data Traffic Type | IPinIP Header Bytes - Without ROHC Compression | IPinIP Header Bytes with Outer IP-Only Compression | Avg. Gain % with Outer IP-Only Compression |
|---|---|---|---|---|
| IPv4-Only | Fragmented ICMP | 20 | 5 | 75 |

FIG. 9B

SYSTEM AND METHOD FOR FRAGMENTED IPv4 HEADER COMPRESSION WITH ROBUST HEADER COMPRESSION IN A DATA COMMUNICATION NETWORK

TECHNICAL FIELD

The present disclosure is related generally to satellite communication systems, and in particular to fragmented IPv4 header compression with Robust Header Compression (ROHC) in data communication systems.

BACKGROUND

Modern data communication systems, such as, for example, satellite communication systems, terrestrial communication systems, fiber communication systems, etc., provide a robust and reliable infrastructure to distribute data across vast distances, especially in remote areas where traditional networks, such as cable and cellular networks, are unreliable and/or unavailable. Significant time and effort have been spent in trying to find ways to increase the reliability and availability of data communication systems, including satellite communication systems. Taking a satellite communication system as an example of a data communication system, RF gateways are provided which include the hardware and software needed to transmit data to and receive data from a satellite. An RF gateway provides communication links, using satellites, for connecting a user terminal (UT) to other UTs or users of other communication systems, such as a public switched telephone network, the internet and various public and/or private networks. A satellite is an orbiting receiver and repeater used to relay information.

ROHC is a standardized header compression framework and protocol which provides improvements in link efficiency of data communication systems for various protocols, including Transmission Control Protocol (TCP), User Datagram Protocol (UDP), Internet Protocol (IP), Real-time Transport Protocol (RTP), etc. utilized in communications such as the Web, file transfers, streaming applications, etc. ROHC can be used for interactive applications such as the web, email, file transfer, Voice over IP (VOIP) and Video over IP. Major advantages of ROHC are reduction in header overhead to save satellite bandwidth, reductions in packet loss rates and interactive response times (improving user experience of applications) and enabling more users to use the same communication link. However, the standard ROHC Request for Comments (RFC) 3095 makes certain assumptions regarding fragmented IPv4 packets and skip these fragmented IPv4 packets from being compressed with ROHC framework. This results in limitations in the use of ROHC.

SUMMARY

In one general aspect, the instant disclosure presents a communication system for indicating in a datagram with a Robust Header Compression (ROHC) header, that has been formed by compressing an uncompressed IPv4 header, that the uncompressed IPv4 header has been fragmented, the communication system including a processor and a memory in communication with the processor, the memory comprising executable instructions that, when executed by the processor alone or in combination with other processors, cause the communication system to perform functions of: receiving the datagram with the uncompressed IPv4 header at a ROHC compressor in the communication system; and compressing the uncompressed IPv4 header using the ROHC compressor to form the datagram with the ROHC header. The compressing by the ROHC compressor includes: setting a flag in a dynamic part of an initialization and refresh (IR) packet of the ROHC header indicating that a 'more fragment flag' (MF) bit and a non-zero 'fragment offset' field are present in the ROHC header; and appending the MF bit and the non-zero 'fragment offset' field at an end of the IR packet.

In another general aspect, the instant disclosure presents a communication system for indicating in a datagram with a Robust Header Compression (ROHC) header, that has been formed by compressing an uncompressed IPv4 header, that the uncompressed IPv4 header has been fragmented, the communication system including a processor; and a memory in communication with the processor. The memory includes executable instructions that, when executed by the processor alone or in combination with other processors, cause the communication system to perform functions of: receiving a datagram with an uncompressed IPv4 header at a ROHC compressor in the communication system; compressing the uncompressed IPv4 header using the ROHC compressor to form the datagram with the ROHC header. The compressing by the ROHC compressor includes: setting a flag in a co-common packet of the ROHC header indicating that a 'more fragment flag' (MF) bit and a non-zero 'fragment offset' field are present in the ROHC header; and appending the MF bit and the non-zero 'fragment offset' field at an end of the co-common packet.

In another general aspect, the instant disclosure presents a method implemented in a communication system for indicating in a datagram with a Robust Header Compression (ROHC) header, that has been formed by compressing an uncompressed IPv4 header, that the uncompressed IPv4 header has been fragmented, the method comprising: receiving a datagram with the uncompressed IPv4 header at a ROHC compressor in the communication system; and compressing the uncompressed IPv4 header using the ROHC compressor to form the datagram with the ROHC header. The compressing by the ROHC compressor includes: setting a flag in a dynamic part of an initialization and refresh (IR) packet of the ROHC header indicating that a 'more fragment flag' (MF) bit and a non-zero 'fragment offset' field are present in the ROHC header; and appending the MF bit and the non-zero 'fragment offset' field at an end of the IR packet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 5A shows a table to illustrate the introduction of a 'more frag (MF) and frag offset' indicator flag into a ROHC initialization and refresh (IR) packet in accordance with aspects of the disclosure.

FIG. 5B shows a table to illustrate the introduction of a 'more frag (MF) and frag offset' indicator flag into a ROHC co-common packet in accordance with aspects of the disclosure.

FIGS. 9A and 9B show tables to illustrate test results using the ROHC system and method disclosed herein in accordance with aspects of the disclosure.

DETAILED DESCRIPTION

Figure 1:
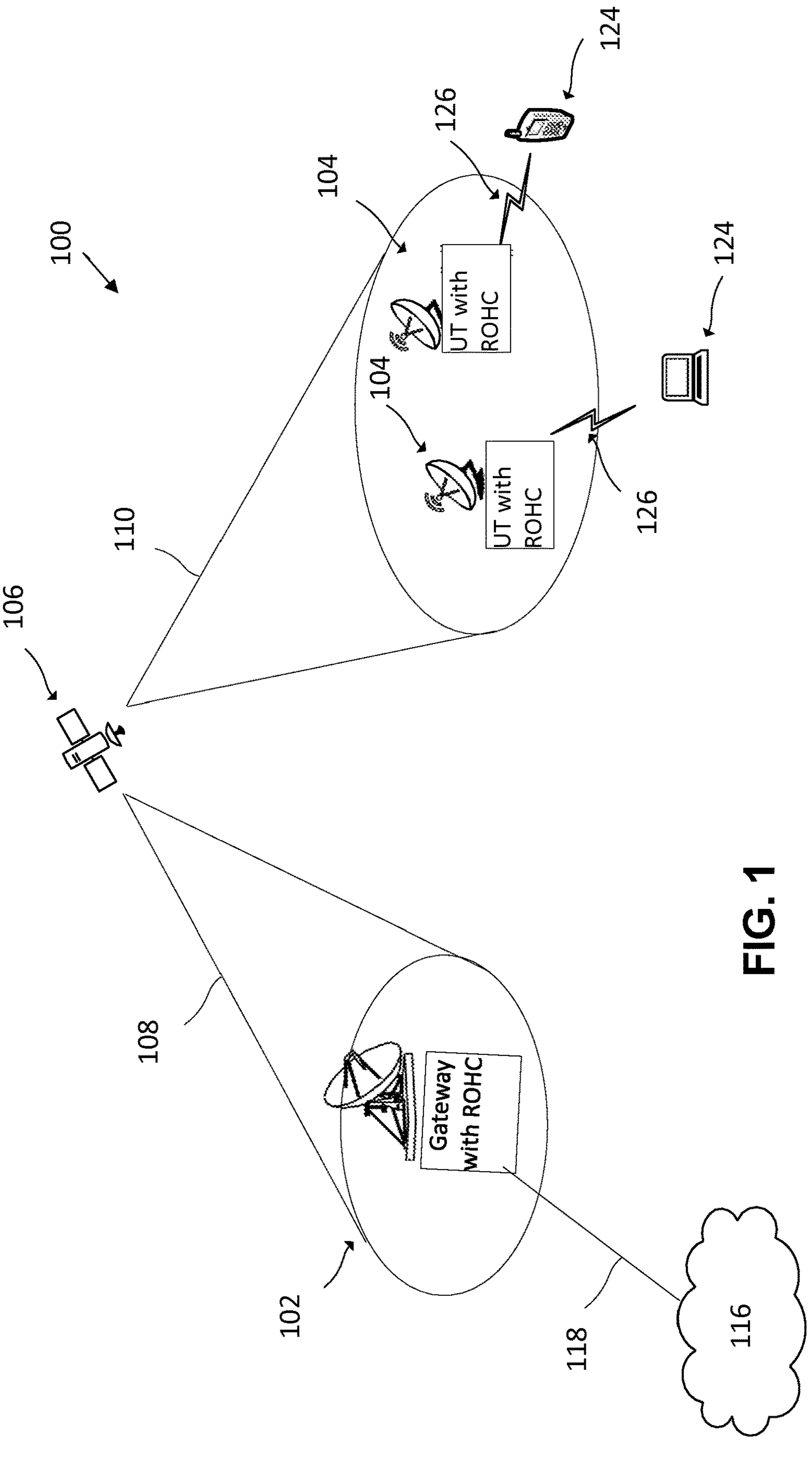
FIG. 1 is a diagram showing an example satellite communication system in which the ROHC system and method disclosed herein may be implemented in accordance with aspects of the disclosure.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Modern data communication systems provide a robust and reliable infrastructure to distribute data across vast distances, especially in remote areas where traditional networks, such as cable and cellular networks, are unreliable and/or unavailable. Satellite communication systems are one example of such data communications systems, and they have become an essential resource for many applications and services, including television, telephone, radio, internet, and military applications, due to the global connectivity and high data transmission rates provided by these systems. Due to the widespread use and often critical nature of data communication services, significant effort has been expended in finding ways to improve reliability, efficiency, and quality of service of data communication systems. Although the description provided herein is primarily with regard to satellite communication systems, it is to be understood that other data communication systems can also utilize the features described in the present disclosure to provide significant improvements over previous data communication systems and methods.

In a network system, packet fragmentation of data packets sent over a communication link such as a satellite link happens when the packet size is greater than the MTU (Maximum Transmission Unit) size. Internet Protocol (IP) layer (Layer 3 in an OSI Open Communication System model) performs the packet fragmentation. This disclosure focuses only on IPv4 header fragmentation in discussing the methods and systems disclosed herein. IPv4 headers consist of various fields including source IP, destination IP, a More fragment flag bit (MF), a fragment offset field, etc. Out of these, the More fragment flag bit (MF) and fragment offset field indicate if a packet has undergone a fragmentation, and, if so, the location of the particular packet within a group of fragmented packets. In other words, if the MF bit is "1," it indicates that there are more fragmented packets coming within the fragmented datagram being transmitted in fragments. If the MF bit is "0," it indicates that the current fragment packet is the last packet in the fragmented datagram. Similarly, the fragment offset field indicates where the current packet is positioned among all of the fragment packets in the fragmented datagram.

As noted above, ROHC is a standardized technique to compress headers of network packets which can be transmitted over communications links such as satellite links. ROHC RFC 3095 defines a framework for header compression of various ROHC profiles including UDP, RTP, etc. ROHC RFC 5225 states various packet header formats for ROHC including Initialization and Refresh Header Format (IR), co_common, co_repair, pt_0_crc3, pt_0_crc7, pt_1_rnd, pt_1_seq_id, etc. ROHC RFC 3843 defines compression profiles for IP-Only and multiple levels of IP header profiles, and states that the IP-only profile follows a framework defined in ROHC RFC 3095 and compressed header formats stated in ROHC RFC 5225.

Although ROHC IP-only profiles include types IPv4 and IPV6, this disclosure focuses on the IPv4 only type for compression of an IPV4 fragmented packet. ROHC RFC 3843 describes multiple levels of IP headers. The present disclosure focuses only on two levels of IP header compression, i.e., IPinIP. With two layers of IPinIP, the IPinIP encapsulations shown below are possible:

IPv4 in IPv4-IPv4 (innermost header) in IPv4 (outermost header)

IPv4 in IPV6-IPv4 (innermost header) in IPv6 (outermost header)

IPv6 in IPv4-IPv6 (innermost header) in IPv4 (outermost header)

IPv6 in IPV6-IPv6 (innermost header) in IPv6 (outermost header)

Although, IPinIP encapsulation can have the above established encapsulations, this disclosure focuses only on IPv4 (innermost) in IPv4 (outermost) and IPv4 (innermost) in IPv6 (outermost). As such, henceforth in this disclosure, IPinIP refers to two levels of IP headers where the innermost IP header is IPv4.

As stated earlier, the More fragment flags bit (MF bit) and the fragment offset fields in an IPv4 header indicate if the packet has undergone fragmentation or not. For IP-only compression and multiple Levels of IP compression, ROHC RFC 3095 expects the More fragment flag bit (MF) and the fragment offset fields from the IPv4 header to be zero for compression framework. Therefore, ROHC 3095 eliminates these fields from being sent in compressed ROHC headers, assuming no fragmentation occurs and defines them as Static-Known Fields. However, in some networks there can arise a situation where packet size can be greater than MTU (Maximum Transmission Unit) size, and this can result in fragmentation, contrary to the assumptions made in ROHC RFC 3095. Hence, it would be highly useful to handle compression of fragmented headers in IPv4-only profile and two-level IPinIP profile situations where the packet size is greater than the MTU. The present disclosure provides an effective and convenient system and method to achieve this. More particularly, the present disclosure is related to a system and method for indicating in a compressed ROHC header that the IPv4 packet is fragmented and providing an indication as to whether a 'fragment flag' (MF) bit and a non-zero 'fragment offset' field is present in the IPv4 header.

Accordingly, IPv4 header fragmentation is possible and to gain advantage of such header compression, particularly in situations of IPV4 ROHC header compression, a bit is introduced in the dynamic portion of the IR packet of ROHC compression packets as a first flag, which is herein referred to as a 'more_frag_and_frag_offset_indicator' flag. This indicates that there exists a 'More fragment flag' bit set and a 'fragment offset' field in the IPv4 header. When the 'more_frag_and_frag_offset_indicator' flag (which can be a single bit among the reserved bits) is set in this manner in the dynamic portion of the IR packet, the fields 'More fragment flag' and 'Fragment offset' can be appended at the end of the IR packet of the ROHC header. Similar arrangements can be made for the co-common packet of the ROHC header. For example, similar to the above-described IR packet, one can introduce a 'more_frag_and_frag_offset_indicator' flag in the co-common packet as well. When this indicator is set, the fields 'More fragment flag' and 'Fragment offset' can be added as part of an irregular chain at the end of the co-common message. It is noted that the co-common packet always follows the IR packet in an ROHC header, and, in accordance with implementations of the present disclosure, the above-noted indicator flag can be set in either the IR packet or the co-common packet, or both.

FIG. 1 is a simplified diagram of an exemplary satellite communication system 100 in which the systems and methods disclosed herein may be implemented. Satellite communications system 100 includes a gateway 102 (also known as a ground station, hub, gateway, and the like), one or more UTs 104, and a satellite system 106. Satellite system 106 includes one or more low earth orbit (LEO), medium earth orbit (MEO), and/or geostationary orbit (GEO) satellite systems. Satellite system 106 emits satellite signals in the form of spot beams 108, 110 which cover a limited geographic area. In the embodiment of FIG. 1, satellite system 106 emits a spot beam 108 which covers the geographic area in which the gateway is located and a spot beam 110 which covers the geographic area in which the UTs 104 are located. Gateway 102 communicates with UTs 104 using forward and return (or reverse) links established via the spot beams 108, 110. Forward links refer to transmissions from the gateway to the UTs, and return links refer to transmissions from the UTs to the gateway. The forward link includes an uplink from the gateway to the satellite and a downlink from the satellite to the UTs. The return link includes an uplink from the UTs to the satellite and a downlink from the satellite to the gateway.

As shown in FIG. 1, the gateway 102 and the UTs 104 both include ROHC arrangements to provide the header compression discussed above. As will be discussed below, these ROHC arrangements can include a ROHC compressor and ROHC decompressor.

Figure 2A:
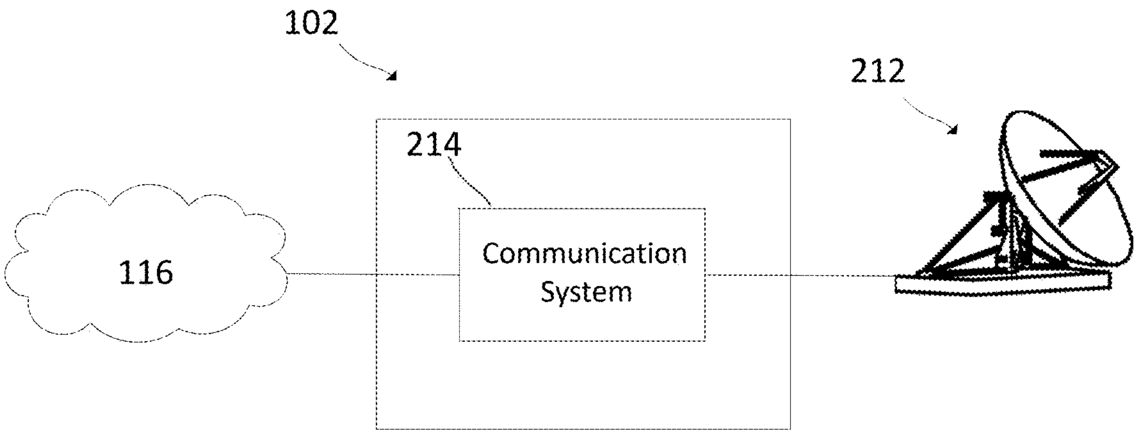
FIG. 2A shows a schematic diagram of an embodiment of a gateway for the system of FIG. 1 in accordance with aspects of the disclosure.

Referring to FIG. 2A, gateway 102 includes an antenna system 212 and a communication system 214 for communicating with the satellite system 106 (noting that although a satellite system is described, the present disclosure can be advantageously utilized in other data communication systems and methods). The antenna system 212 comprises any suitable number and/or type(s) of antenna for sending and receiving data to and from a satellite. In embodiments, antenna system 212 includes one or more large antennas and/or antenna arrays. Communication system 214 includes one or more computing devices and hardware, such as interfaces, modulators, demodulators, power amplifiers, and the like, for enabling communications to and from the network and to and from satellite. Examples of computing devices that may be used in gateway 102 include servers, desktop computers, laptops, and the like which can be used to control different operations and devices associated with the gateway 102. The gateway 102 will also include at least a ROHC compressor, as will be discussed further herein. The gateway 102 may also include a ROHC decompressor if the communication via the satellite is bidirectional, as will also be discussed further herein.

The gateway 102 is configured to provide connectivity to ground telecommunications infrastructures, such as, for example, network system 116. Solely for purposes of example, it is noted that network system 116 can include one or more networks, such as, for example, the Internet, an IP network, an intranet, a wide-area network (WAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting communications between devices as described herein. Network system 116 may include both wired and wireless connections as well as optical links. Network system 116 may connect gateway 102 with other gateways that may be in communication with satellite system 106 or with other satellites.

Gateway 102 is connected to the network system 116 by a communication link 118. In embodiments, the communication link 118 can be a fiber optic communication link although any suitable type of communication link may be used. Gateway 102 receives data from UTs 104 via satellite system 106 and converts the data to a suitable format for communication to the network system 116 via communication link 118. Gateway 102 also receives data from the network system 116 via communication link 118 and converts the data for transmission to UTs 104 via satellite system 106.

Figure 2B:
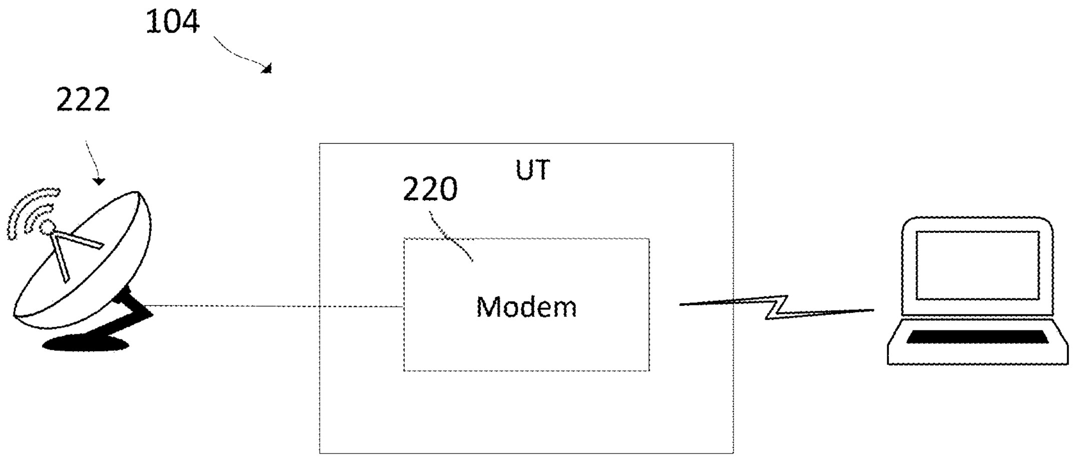
FIG. 2B shows a schematic diagram of an embodiment of a user terminal for the system of FIG. 1 in accordance with aspects of the disclosure.

Referring to FIG. 2B, UTs 104 (also known as satellite terminals) each include a modem 220 and antenna array 222 for communicating with satellite system 106. Modem 220 is configured to transmit and receive signals to and from the satellite system 106 via the antenna array 222. To this end, modem 220 may include one or more modulators, demodulators, amplifiers, gain control devices and the like. Antenna array 222 comprises one or more antennas that enable signals to be transmitted to and received from the satellite system 106. In embodiments, antenna array 222 comprises a phased array antenna. Phased array antennas are electronically steerable, meaning that the direction and shape of radiated signals can be changed electronically without having to physically move the antenna. As noted above, the UTs 104 will also include at least a ROHC decompressor. They may also include a ROHC compressor if the communication via the satellite is bidirectional.

UTs 104 enable client devices 124 to connect to the network system 116 via the satellite system 106 and gateway 102. The client devices 124 include various computing devices which can be used by a consumer to communicate and/or access external networks. Examples of suitable client devices 124 include but are not limited to personal computers, desktop computers, laptop computers, mobile telephones, smart phones, tablets, phablets, smart watches, wearable computers, gaming devices/computers, televisions, and the like. In embodiments, each client device 124 is connected to an associated UT 104 by a communication link 126, such as a local area network (LAN). In embodiments, communication link 126 includes one or more wired or wireless networks, such as Wi-Fi or ethernet. Although FIG. 1 only illustrates one gateway 102 and two UTs 104, satellite communication system 100 can include any number of gateways 102 and UTs 104.

Communications via a satellite utilize one or more carriers over uplinks via which signals are transmitted to a satellite system 106 from a gateway 102 or UT 104 and downlinks via which signals are transmitted from satellite system 106 to gateway 102 or UT 104. Each carrier corresponds to a contiguous span of a frequency band or spectrum. Each carrier may have different characteristics in terms of coverage (the range around the antenna where signals can still be received) and capacity (bandwidth, data rates, throughput). In embodiments, the satellite system 106 is configured to utilize carrier aggregation. Carrier aggregation involves combining multiple carriers together in the same or different frequency bands to increase the effective bandwidth and improve data rates for users.

Figure 3:
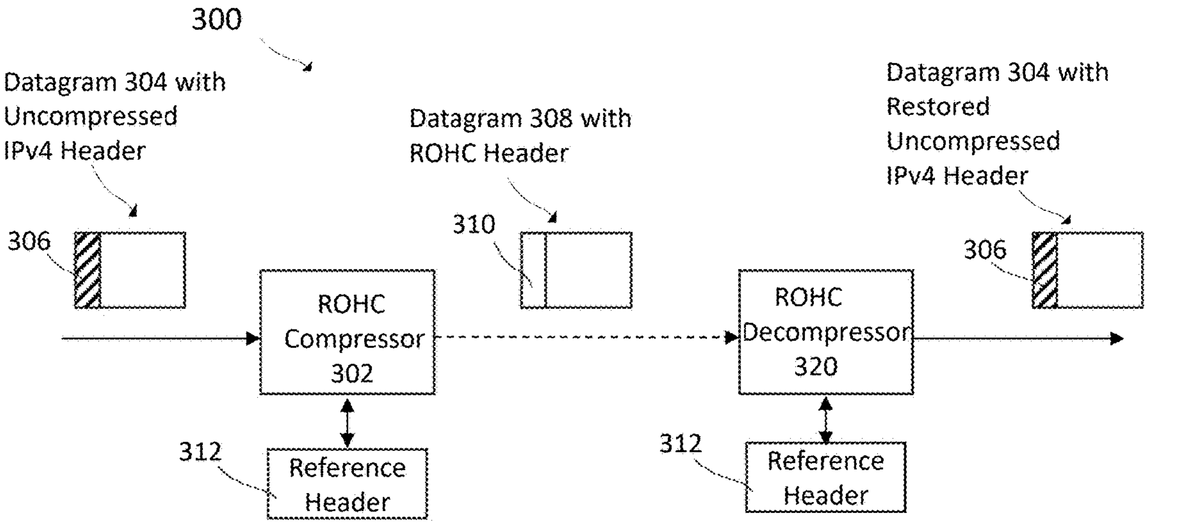
FIG. 3 shows a schematic diagram of an ROHC compressor/decompressor operating scheme in accordance with aspects of the disclosure.

FIG. 3 shows a schematic diagram of an ROHC compressor/decompressor operating system 300 in accordance with aspects of the disclosure. For example, a ROHC compressor 302 can be provided in order to carry out the ROHC compression to significantly reduce the size of the header. In an implementation, the ROHC compressor 302 compresses the headers of datagrams 304 which have IPv4 headers 306 to form datagrams 308 having ROHC headers 310. This compression is carried out using a reference header 312 in accordance with known compression procedures. In the satellite system shown in FIGS. 1 and 2, this ROHC compressor 302 can be utilized in the communication system 214 of the gateway 102. As such, after the ROHC compression, the datagrams 308 with the ROHC headers 310 can be transmitted to the UTs 104 via the satellite 106.

At the UTs 104, a ROHC decompressor 320 can be provided in the modem 220 to restore the datagrams 308 with the ROHC headers 310 received from the gateway 102 back to the original datagrams 304 with the original headers 306 using the reference header 312. As noted above, although the above description provides for the ROHC compressor 302 being in the communication system 214 of the gateway 102 and the ROHC decompressor 320 being in the modem 220 of the UTs 104, the modem 220 of the UTs 104 can include a ROHC compressor 302 and the communication system 214 of the gateway 102 can include a ROHC decompressor 320 if bidirectional communication is being used.

Figure 4:
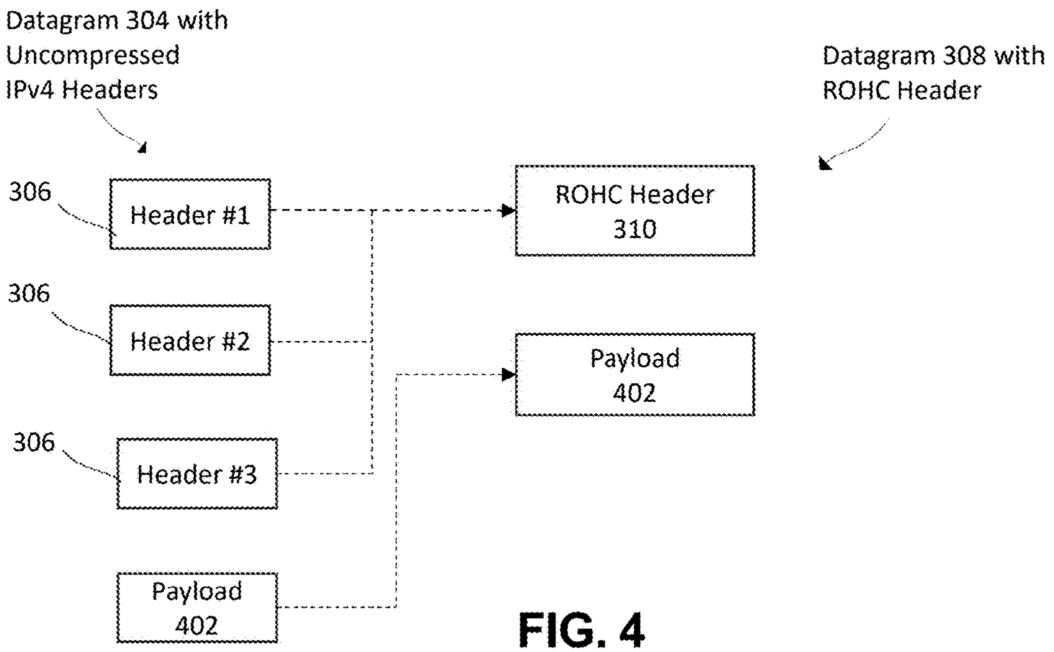
FIG. 4 shows conversion of a non-compressed packet to a ROHC packet in accordance with aspects of the disclosure.

FIG. 4 shows an example of conversion of a non-compressed IPv4 header packet 306 to a ROHC header packet 310 in accordance with aspects of the disclosure in situations where multiple uncompressed headers are used to form a single ROHC header. Specifically, as shown in FIG. 4, a non-compressed datagram 304, such as a non-compressed IPv4 packet, can have a number of uncompressed headers 306 and a payload 402 to form a datagram such as the datagrams 304 discussed above with reference to FIG. 3. The payload 402 can be whatever data is being transmitted, such as voice, video, etc. Using an ROHC compressor 302, as shown in FIG. 3, the non-compressed datagram 304 is converted to a ROHC datagram 308, with a ROHC header 310 replacing the non-compressed headers 306. The payload 402 can remain the same. In other words, in this arrangement, only the headers 306 of the non-compressed datagram 304 are compressed to form the ROHC datagram 308. It is noted that some of the headers 306 may be fragmented while others of the headers 306 may not be fragmented.

FIG. 5A shows a table to illustrate the introduction of a 'more frag (MF) and frag offset indicator' flag into a ROHC initialization and refresh (IR) packet in accordance with aspects of the disclosure. As noted above, an important aspect of the present disclosure is introducing a 'more_frag_and_frag_offset_indicator' flag in encoding a dynamic part of an IR packet and/or a co-common packet format of the ROHC framework. This 'more_frag_and_frag_offset_indicator' flag 502 is shown in the right side of FIG. 5A in a dynamic part 504' of the IR packet 500. In an implementation of the present disclosure, this 'more_frag_and_frag_offset_indicator' flag 502 indicates that the user data packet (e.g., IPv4-Only profile or IPinIP profile) has a 'more fragment flag' bit (MF bit) set and a non-zero 'fragment offset' field present in the IPv4 header. Further, when this 'more_frag_and_frag_offset_indicator' flag 502 is set, fields 510 for a 'More fragment flag' bit and 'Fragment offset' field, will be appended to the dynamic part 504' of IR packet 500. The left side of FIG. 5A shows the dynamic part 504 of the IR packet 500 before the flag 502 has been introduced into the dynamic part 504.

More particularly, an IPV4 header 'Initialization and Refresh Header Format' (IR) ROHC packet contains static and dynamic parts. As 'More fragment flag' bit and 'fragment offset' fields are part of dynamic portion 504 of the IPV4 header, introducing a 'more_frag_and_frag_offset_indicator' flag 502 in encoding of the dynamic part 504' of the IR packet is shown in the right side of FIG. 5A. When this 'more_frag_and_frag_offset_indicator' flag 502 is set, both a 'more fragment flag' bit and a 'fragment offset' field 510 from the IPv4 header will be appended as part of an irregular part 512 at the end of the IR packet, as shown in FIG. 5A.

FIG. 5B shows a table to illustrate the introduction of a 'more frag (MF) and frag offset' indicator flag into a ROHC co-common packet 520 in accordance with another aspect of the present disclosure. Like the IR packet 500 discussed above with regard to FIG. 5A, a 'more_frag_and_frag_offset_indicator' flag 502' will also be set in co-common packet 520 as part of flags byte. When set, fields 510' for a 'More fragment flag' bit (MF) and a 'Fragment offset' field will be included as part of an irregular chain at the end of the co-common header 520'. The left side of FIG. 5B shows the co-common header 520 before the flag 502' has been introduced into the co-common header 520.

More particularly, in a ROHC IP-Only profile, a co-common packet contains various flags and other fields. Introducing 'more_frag_and_frag_offset_indicator' flag 502' as part of flags field 505 is shown in FIG. 5B. When the 'more_frag_and_frag_offset_indicator' flag 502' is set, 'more fragment flag' bit and 'fragment offset' fields 510' will be present as part of an irregular chain 515 after the 'co-common' header, as shown in the pseudo structure 'more_frag_and_frag_offset' field 510' in FIG. 5B.

Figure 6A:
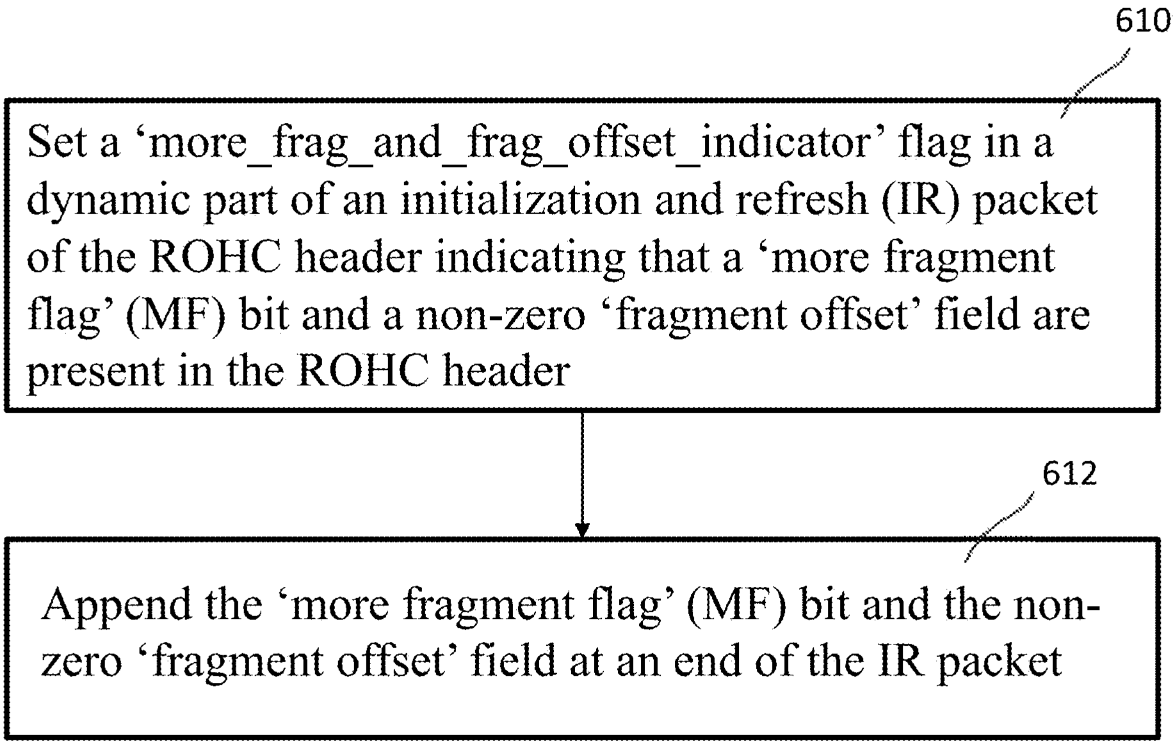
FIG. 6A shows a flowchart for implementing the present disclosure with a ROHC initialization and refresh (IR) packet in accordance with aspects of the disclosure.

FIG. 6A shows a flowchart for implementing the present disclosure with a ROHC initialization and refresh (IR) packet in accordance with aspects of the disclosure. In step 610, compressing the uncompressed IPv4 header using an ROHC compressor to form the datagram with the ROHC header includes setting a flag in a dynamic part of an initialization and refresh (IR) packet of the ROHC header indicating that a 'more fragment flag' (MF) bit and a non-zero 'fragment offset' field are present in the ROHC header. In step 612, the compressing operation further includes appending the 'more fragment flag' (MF) bit and the non-zero 'fragment offset' field at an end of the IR packet.

Figure 6B:
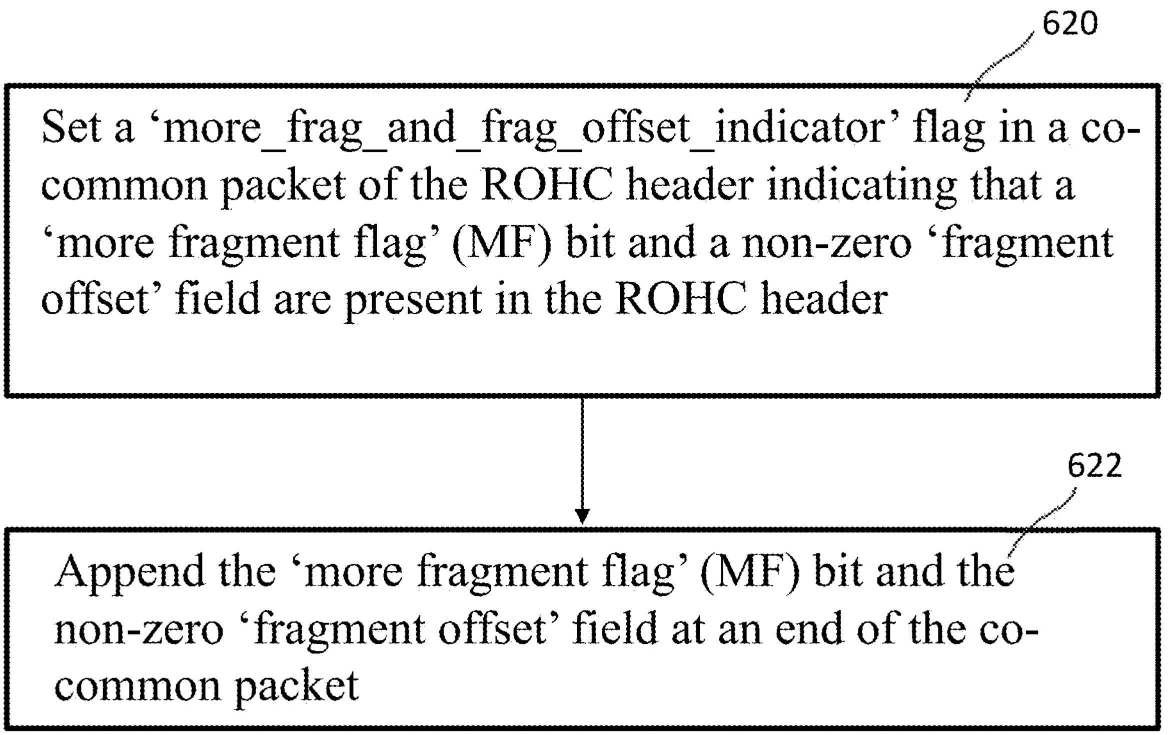
FIG. 6B shows a flowchart for implementing the present disclosure with a ROHC co-common packet in accordance with aspects of the disclosure.

FIG. 6B shows a flowchart for implementing the present disclosure with a ROHC co-common packet in accordance with aspects of the disclosure. In step 620, compressing the uncompressed IPv4 header using an ROHC compressor to form the datagram with the ROHC header includes setting a flag in a co-common packet of the ROHC header indicating that a 'more fragment flag' (MF) bit and a non-zero 'fragment offset' field are present in the ROHC header. In step 622, the compressing operation further includes appending the 'more fragment flag' (MF) bit and the non-zero 'fragment offset' field at an end of the co-common packet.

Figure 7:
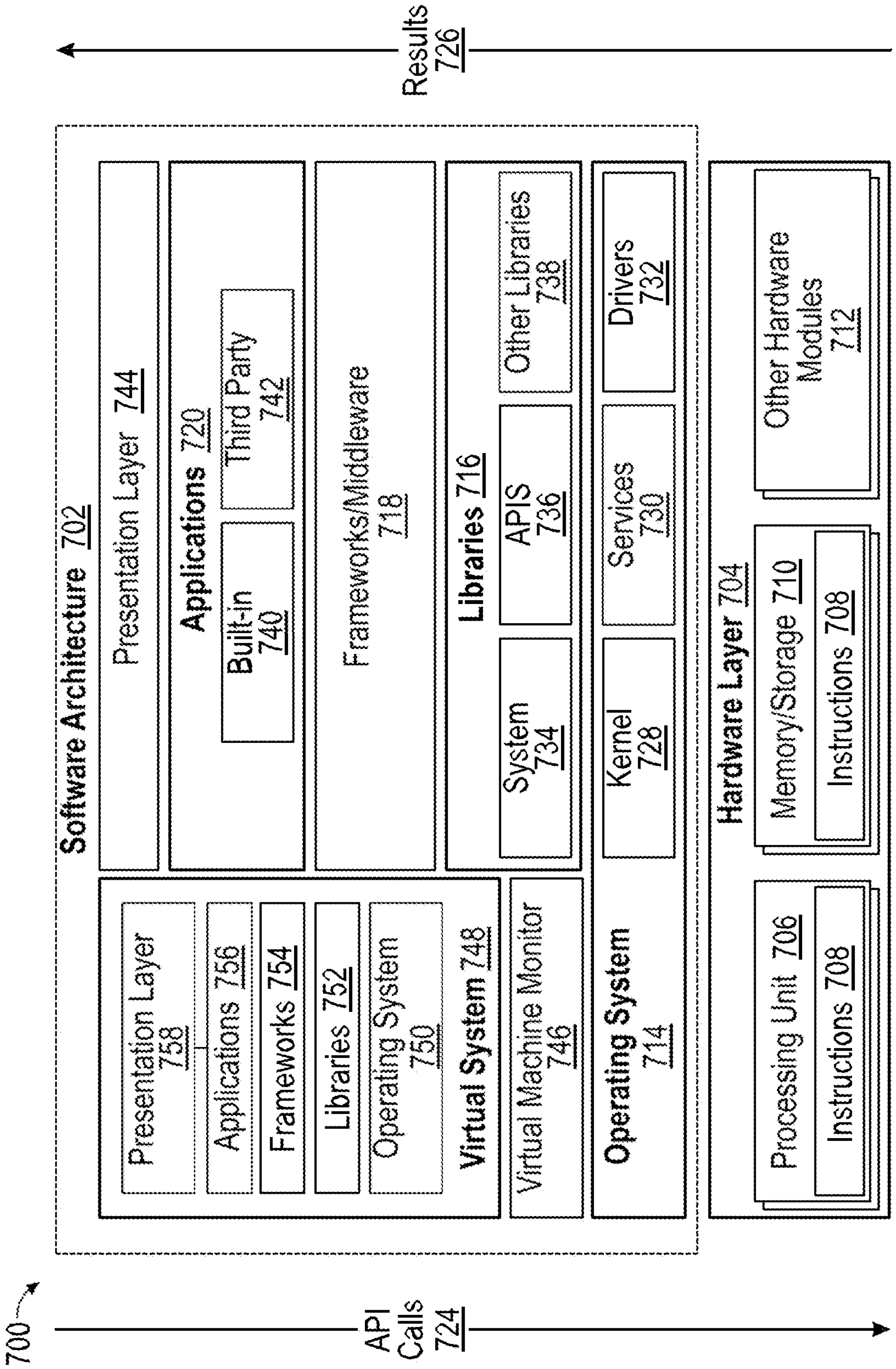
FIG. 7 is a block diagram illustrating an example software architecture, various portions of which may be used in conjunction with various hardware architectures herein described in accordance with aspects of the disclosure.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, components of the satellite communication system 100 and ROHC implementations of FIGS. 1-6. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
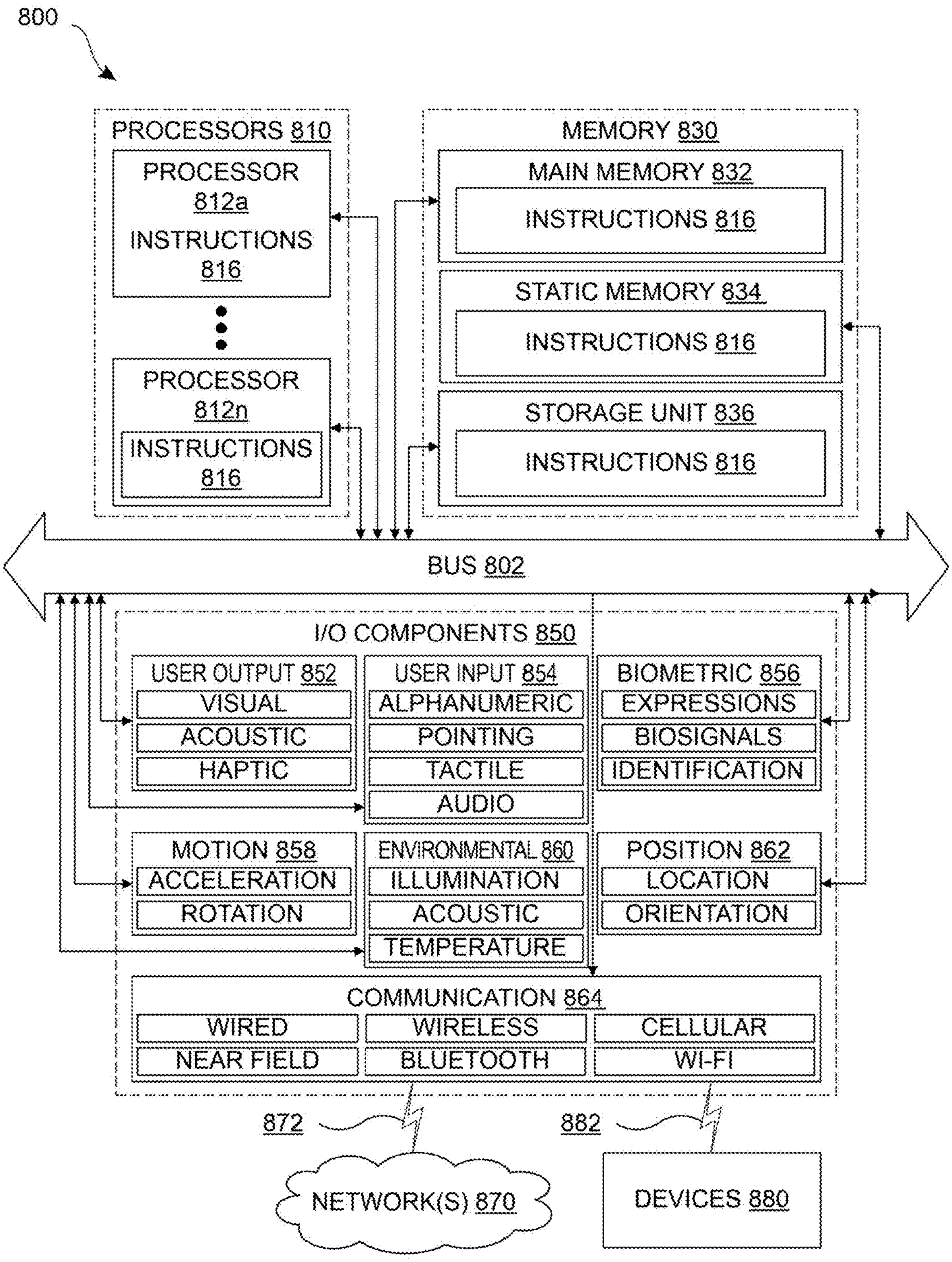
FIG. 8 is a block diagram illustrating components of an example machine configured to read instructions from a machine-readable medium and perform any of the features described herein in accordance with aspects of the disclosure.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term 'machine' includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

FIGS. 9A and 9B show tables to illustrate test results using the ROHC system and method disclosed herein in accordance with aspects of the disclosure. For example, FIG. 9A shows test results regarding an average percentage gain comparison for a fragmented IPinIP packet (where an innermost header is an IPv4 header and is fragmented) between raw IPinIP header bytes when uncompressed without ROHC, gain achieved with only outermost IP header of the fragmented IPinIP header compression (partial ROHC if the features of the present disclosure are absent and an IP-only profile is present) and gain achieved by compressing a fragmented IPinIP header utilizing the present disclosure.

Referring to FIG. 9B, test results are show with regard to an average percentage gain comparison for fragmented IPv4 packets between raw fragmented IPv4 header bytes when uncompressed without ROHC and the gain achieved by compressing a fragmented IPv4 header using the features of the present disclosure.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A communication system for indicating in a datagram with a Robust Header Compression (ROHC) header, that has been formed by compressing an uncompressed IPv4 header, that the uncompressed IPv4 header has been fragmented, the communication system comprising:

a processor; and a memory in communication with the processor, the memory comprising executable instructions that, when executed by the processor alone or in combination with other processors, cause the communication system to perform functions of:

receiving the datagram with the uncompressed IPv4 header at a ROHC compressor in the communication system; and compressing the uncompressed IPv4 header using the ROHC compressor to form the datagram with the ROHC header, wherein the compressing by the ROHC compressor includes:

setting a flag in a dynamic part of an initialization and refresh (IR) packet of the ROHC header indicating that a 'more fragment flag' (MF) bit and a non-zero 'fragment offset' field are present in the ROHC header; and appending the MF bit and the non-zero 'fragment offset' field at an end of the IR packet.

2. The communication system of claim 1, wherein the communication system is a satellite communication system.

3. The communication system of claim 2, wherein the ROHC header has an IP-only profile enabled or is configured to support an IP-only profile.

4. The communication system of claim 3, wherein the ROHC header has two levels of IP header compression.

5. The communication system of claim 4, wherein the two levels of IP header compression include an innermost header and an outermost header.

6. The communication system of claim 5, wherein setting the flag and appending the MF bit and the non-zero 'fragment offset' field at an end of the IR packet is performed only for an innermost ROHC header.

7. The communication system of claim 1, wherein the flag is set as one of a plurality of reserved bits in the dynamic part of the IR packet.

8. The communication system of claim 1, wherein the instructions, when executed by the processor alone or in combination with other processors, cause the communication system to perform further functions of:

setting the flag in a co-common packet of the ROHC header indicating that the MF bit and the non-zero 'fragment offset' field are present in the ROHC header; and appending the 'more fragment flag' (MF) bit and the non-zero 'fragment offset' field at an end of the co-common packet.

9. The communication system of claim 8, wherein the communication system is a satellite communication system.

10. A communication system for indicating in a datagram with a Robust Header Compression (ROHC) header, that has been formed by compressing an uncompressed IPv4 header, that the uncompressed IPv4 header has been fragmented, the communication system comprising:

a processor; and a memory in communication with the processor, the memory comprising executable instructions that, when executed by the processor alone or in combination with other processors, cause the communication system to perform functions of:

receiving a datagram with an uncompressed IPv4 header at a ROHC compressor in the communication system;

compressing the uncompressed IPv4 header using the ROHC compressor to form the datagram with the ROHC header, wherein the compressing by the ROHC compressor includes:

setting a flag in a co-common packet of the ROHC header indicating that a 'more fragment flag' (MF) bit and a non-zero 'fragment offset' field are present in the ROHC header; and appending the MF bit and the non-zero 'fragment offset' field at an end of the co-common packet.

11. The communication system of claim 10, wherein the communication system is a satellite communication system.

12. The communication system of claim 11, wherein the ROHC header has an IP-only profile enabled or is configured to support an IP-only profile.

13. The communication system of claim 11, wherein the ROHC header has two levels of IP header compression.

14. The communication system of claim 13, wherein the two levels of IP header compression include an innermost header and an outermost header.

15. The communication system of claim 14, wherein setting the flag and appending the MF bit and the non-zero 'fragment offset' field at an end of the co-common packet is performed only for an innermost ROHC header.

16. A method implemented in a communication system for indicating in a datagram with a Robust Header Compression (ROHC) header, that has been formed by compressing an uncompressed IPv4 header, that the uncompressed IPv4 header has been fragmented, the method comprising:

receiving a datagram with the uncompressed IPv4 header at a ROHC compressor in the communication system; and compressing the uncompressed IPv4 header using the ROHC compressor to form the datagram with the ROHC header, wherein the compressing by the ROHC compressor includes:

setting a flag in a dynamic part of an initialization and refresh (IR) packet of the ROHC header indicating that a 'more fragment flag' (MF) bit and a non-zero 'fragment offset' field are present in the ROHC header; and appending the MF bit and the non-zero 'fragment offset' field at an end of the IR packet.

17. The method of claim 16, wherein the communication system is a satellite communication system.

18. The method of claim 17, wherein the ROHC header has an IP-only profile enabled or is configured to support an IP-only profile.

19. The method of claim 18, wherein the ROHC header has two levels of IP header compression which include an innermost header and an outermost header, and the innermost header is the ROHC header formed from the uncompressed IPv4 header.

20. The method of claim 16, further comprising:

setting the flag in a co-common packet of the ROHC header indicating that the 'more fragment flag' (MF) bit and the non-zero 'fragment offset' field are present in the ROHC header; and appending the MF bit and the non-zero 'fragment offset' field at an end of the co-common packet.

* * * * *